US007006995B1

(12) United States Patent
Edenson et al.

(10) Patent No.: US 7,006,995 B1
(45) Date of Patent: Feb. 28, 2006

(54) SECURE DISTRIBUTION OF DIGITAL DATA

(75) Inventors: Roy I. Edenson, Richardson, TX (US);
Peter F. van Kessel, Allen, TX (US);
Gregory J. Hewlett, Blue Bell, PA
(US); Paul S. Breedlove, McKinney,
TX (US); William B. Werner, Plano,
TX (US); Keith H. Elliott, Plano, TX
(US)

(73) Assignee: Texas Instruments Incorporated,
Dallas, TX (US)

(*) Notice: Subject to any disclaimer, the term of this patent is extended or adjusted under 35 U.S.C. 154(b) by 0 days.

(21) Appl. No.: 09/170,864

(22) Filed: Oct. 13, 1998

Related U.S. Application Data

(60) Provisional application No. 60/061,799, filed on Oct. 14, 1997.

(51) Int. Cl.
*G06F 17/00* (2006.01)

(52) U.S. Cl. .................... 705/51; 713/176; 380/201

(58) Field of Classification Search ............. 340/10.34;
342/51; 380/200, 52, 201, 202, 203, 193,
380/205, 209, 210, 216, 228, 232, 239, 241;
348/714; 345/349; 705/54, 58, 51; 713/176
See application file for complete search history.

(56) References Cited

U.S. PATENT DOCUMENTS 4,117,605 A * 10/1978 Kurland et al. ............. 434/319
4,593,353 A *  6/1986 Pickholtz ..................... 705/55
5,053,774 A * 10/1991 Schermann et al. .......... 342/44
5,469,363 A * 11/1995 Saliga ......................... 364/478
5,602,919 A *  2/1997 Hurta et al. .................. 380/24
5,706,457 A *  1/1998 Dwyer et al. ................ 395/349
5,790,674 A *  8/1998 Houvener et al. ........... 380/23
5,857,020 A *  1/1999 Peterson, Jr. ................ 705/52
6,064,739 A *  5/2000 Davis .......................... 380/200

FOREIGN PATENT DOCUMENTS

JP            409024150 A   *   1/1997

OTHER PUBLICATIONS

IBM Technical Discolsure Bulletin, Title:Universal code reader, vol. 19, TDB-ACC-NO: NN7608956, Aug. 1976.*

* cited by examiner

*Primary Examiner*—Elisca Pierre Eddy
(74) *Attorney, Agent, or Firm*—Charles A. Brill; Wade James Brady, III; Frederick J. Telecky, Jr.

(57) ABSTRACT

A secure digital data distribution system (100) for preventing unauthorized access to digital data. The system utilizes an identification system module (116) embedded in a digital storage media (114) to grant authorization to media players (118). Prior to reading the digital data recorded on the media (114), an identification system interrogator (122) reads authorization data from the identification system module (116) to determine whether the media player (118) is authorized to read the media (114). If the authorization data matches the media player's unique identifier, authorization is granted and the media player (118) commences to read the media (114).

47 Claims, 2 Drawing Sheets

SECURE DISTRIBUTION OF DIGITAL DATA

CROSS-REFERENCE TO RELATED APPLICATIONS

This application claims priority under 35 U.S.C. § 119 (e)(1) of provisional application No. 60/061,799 filed Oct. 14, 1997.

The following patents and/or commonly assigned patent applications are hereby incorporated herein by reference:

| Patent No. | Filing Date | Issue Date | Title |
| --- | --- | --- | --- |
| 5,053,774 | Feb. 13, 1991 | Oct. 1, 1991 | Transponder System |
| 08/850,535 | May 2, 1997 | | A TIRIS Based Kernel for Protection of Copyrighted" Program Material |
| 60/033,543 | Dec. 20, 1996 | | A TIRIS Based BIOS for Protection of "Copyrighted" Program Material |
| 60/048,266 | Jun. 2, 1997 | | Data Protection System |

FIELD OF THE INVENTION

This invention relates to the field of data distribution systems, more particularly to methods and systems for distributing recorded digital data, still more particularly to methods and systems for distributing digital electronic cinema data recorded on optical discs.

BACKGROUND OF THE INVENTION

Motion picture film no longer is a convenient medium by which to distribute video information. Producing copies of a film is a time consuming process which, while not prohibitively expensive or difficult, is much more expensive than modern alternatives such manufacturing optical discs. Film is also a relatively heavy medium which, at 25 pounds a canister, represents a significant shipping expense. Film's disadvantages do not end with production and distribution, display of the films requires a trained projectionist to assemble the films with trailers and to operate the projection system. Furthermore, film quickly degrades, often with more than 80% of the scratches and dirt accumulating on a film within the first two days of release.

In addition to all of the physical drawbacks involved with the use of film to distribute motion pictures, there are also significant security concerns involved with the use of film. These security drawbacks center around the economic structure of the motion picture industry. Motion pictures represent an tremendous investment of capital by the production studios. The production studios rely on a stream of income over an extended period of time to recoup this investment and return a profit. This income stream is fed by admission charges during the initial theater showings of new releases and through various other outlets for older motion pictures such as sales of video cassettes and royalties from television broadcasts.

Unlike many other industries where there are underlying assets such as factories or secret production methodologies which prevent others from competing directly with the original producers of a product, the motion picture industry releases a product that may be easily and cheaply reproduced, or reused, without the necessity of a large capital investment. These reproductions compete directly with the original copies for audiences and markets—without generating additional revenue for the production studios. In the past, these unauthorized reproductions were typically of inferior quality—a trait that limited the demand for the unauthorized reproductions. As motion picture distribution transitions from a photographic-based medium to a digital computer-based medium, however, the unauthorized copies typically will be perfect copies of the original.

Furthermore, since the distribution agreements generally call for a royalty payment based on the number of showings, simply making unauthorized showings of the original also avoids royalty charges. Unauthorized reproductions and additional showings not only deprive the motion picture studios of royalty income, they also reduce the studio's control over the release and publicity of the movie. Advertising heavily influences the motion picture viewing public. The motion picture industry carefully orchestrates the release of each picture to coordinate the distribution with the associated advertising campaign. Box office receipts control the amount of advertising a particular film receives, as well as the number of screens which will show the film. Furthermore, films almost always are released in the United States first, since it is the largest market, and released in other countries several weeks, or often months, later. Unauthorized copies generated from U.S. versions of a film sometimes are shown in foreign theaters as little as one week after the U.S. release date.

Intellectual property laws protect producers of valuable technical and creative information. Specifically, copyright laws are designed to protect the content of motion pictures from unauthorized duplication and performance, both in the United States and internationally. In spite of the protection available through intellectual property laws, motion picture producers have been vulnerable to copyright infringement both in the United States and abroad. This infringement may be perpetrated by the motion picture distributor, theater owner, or even an independent party who gains access to the film. Therefore, the motion picture industry is in need of a system of distribution that improves the security of the motion picture content.

SUMMARY OF THE INVENTION

It is a primary object of the present invention to provide a system and method of distributing digital data which provides data security through a multi-tiered system of safeguards. According to one embodiment of the disclosed invention, a secure digital image projection system is provided which has at least one identification code identifying the image projection system, and comprises: an identification system interrogator for reading an authorization code from an identification system module associated with a data storage medium, a verification unit for verifying the authorization code matches the identification code, a reader for reading digital data stored on the data storage medium, and a projection engine for displaying the digital data on the condition that the authorization code matches the identification code. Examples of identification systems include an RF identification systems and a Texas Instruments Registration and Identification System (TIRIS®) transponder. Variations on this embodiment include systems utilizing encrypted data, compressed data, separate media players and projectors, and tamper-proof cartridges enclosing the storage media.

According to another embodiment of the present invention, a secure digital data media player is disclosed. The secure digital data media comprising: an identification system interrogator for reading authorization information from an identification system module attached to a digital data storage medium and verifying the authorization information authorizes the media player to read the digital data storage medium, and a media reader for reading data from the digital data storage medium and outputting the data on the condition the authorization information authorizes the media player to read the digital data storage medium. Examples of identification system modules include an RF identification system module and a TIRIS transponder. Variations on this embodiment include systems utilizing encrypted data, compressed data, separate media players and projectors, and tamper-proof cartridges enclosing the storage media.

According to another embodiment of the disclosed invention, a secure data storage medium is disclosed. The secure data storage medium comprising: a digital storage medium for storing digital data and an identification system module corresponding to the digital storage medium. The identification system module contains an authorization code describing which media players are authorized to read digital data from the digital storage medium. Variations to this embodiment include the use of an optical disc, an RF identification system, and a TIRIS responder.

According to yet another embodiment of the disclosed invention, a method of securely distributing digital data is disclosed. The disclosed method of securely distributing digital data comprises: writing digital data onto a digital storage medium, and attaching an identification system module to the digital storage medium. According to this embodiment, the identification system module contains an authorization code indicating which media readers are authorized to read the digital storage medium. Variations to this embodiment include the use of an optical disc, an RF identification system, and a TIRIS responder.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

An improved distribution system has been developed that provides improved image quality, improved media durability, reduced media duplication and distribution costs, improved bookkeeping capability, and dramatically improved security. The distribution system is based on digital recording technologies which enable the use of all-digital image projection techniques.

An all-digital image distribution and projection system provides many advantages over traditional analog or mixed digital-analog systems. First, the all-digital nature of the disclosed distribution and projection system provides a higher level of security than possible using analog techniques. The all-digital distribution and projection system enables the use of encryption and decryption schemes which make intercepted data virtually useless to unauthorized parties. Second, because all processing necessary to display the digitized movie data is performed in the digital domain, non-linearities, signal cross-coupling, noise degradation, bandwidth limitations, color impurities, temperature variations, and other degrading artifacts often associated with analog display means are eliminated or significantly reduced. Data errors which do occur are detected and corrected through the use of traditional error detection and correction techniques.

The disclosed distribution system is enabled by the rapid advance in digital communication technologies which have dramatically reduced the amount of information necessary to store and create electronic cinema images, advances in radio frequency (RF) identification technologies, and the availability of true digital imaging technologies. Furthermore, the disclosed secure distribution techniques, while widely applicable outside the motion picture industry, are ideally suited to use in motion picture distribution due to the unique characteristics of the motion picture industry. The disclosed distribution system is ideally suited for implementation in the motion picture industry since there is a demand for the highest possible image quality, a relatively small number of display projectors compared to other markets such as home theater or television, and because of the high cost of existing media duplication and distribution techniques.

Figure 1:
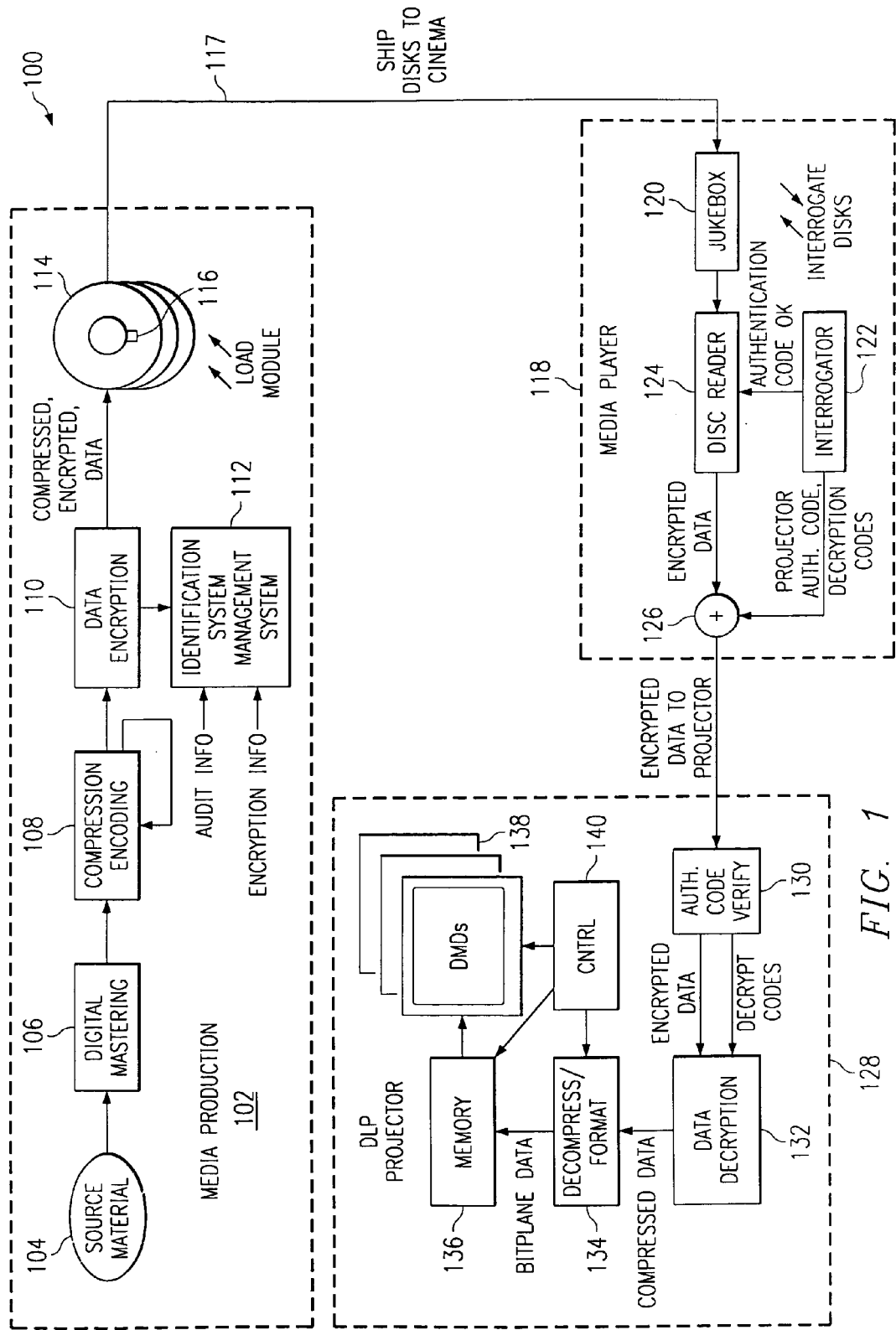
FIG. 1 is a block diagram of one embodiment of an improved distribution system showing the production of the digital media, the distribution of the media, and the playback of media and projection of the resulting image.

FIG. 1 is a block diagram of the improved distribution system showing production of the digital media 102, distribution of the media 117, and playback of media 118 and projection of the resulting image 128. The disclosed data distribution system uses storage media 114, typically optical storage media, which has been coupled with a tamper-proof identification system. The optical data storage medium is preferably a high quality digital optical disk, herein referred to as "theatrical optical discs." Theatrical optical discs are similar to consumer digital video discs (DVD) which are now widely available. Like consumer DVDs, theatrical optical discs provide dense storage of digital information and are relatively inexpensive to produce while providing a high level of physical durability.

Double-sided dual-layer consumer DVDs hold approximately 15.96 gigabytes of information, allowing a two-hour movie to average 2.217 megabytes per second and still fit on a single DVD. Single-sided, single-layer consumer DVDs hold approximately 4.38 gigabytes, limiting a two-hour movie to an average of 608 kilobytes per second. Theater-quality movies require approximately 78.6 megabytes of data per second. Assuming a single theatrical optical disc holds the same amount of data as a double-sided, dual-layer consumer DVD, a compression ratio of 36:1 is necessary to allow a single theatrical optical disc to hold an entire movie. Lower capacities, or lower compression ratios, require several discs to hold a single theater-quality movie.

Coupled with the storage media 114 is a tamper-proof identification system 116. The tamper-proof identification system allows information to be transferred to media players 118 without reading the storage media 114. Many different identification systems are available. The desired characteristics of the identification system are low cost, read/write capability, and the capability to accurately interrogate one device in the presence of other devices without the need for direct contact. One identification system that meets these criteria is the Texas Instruments Registration and Identification System (TIRIS®) which is capable of storing digital information and transmitting that information when exposed to an RF energy source. The remainder of this disclosure will assume the identification system is a TIRIS® module.

The TIRIS transponder system, which is further disclosed in U.S. Pat. No. 5,053,774 is comprised of two portions, an RF responder module 116 which is embedded in or attached to the object to be identified or tracked, an identification module interrogator 122. In use, the RF interrogator 122 energizes the RF module 116 by irradiating the module with a beam of RF energy. The RF module 116 then emits an RF transmission in which information is encoded. The information includes the serial number of the RF module and additional information stored in the RF module 116. This additional information may be read out by the interrogator 122 or stored in the module 116 by the interrogator 122. Depending on the design of the RF module 116, the memory provided by the RF module 116 may be read-only memory, read/write memory, or write-once-read-many memory. Current TIRIS designs are available with at least 1024 bits of memory.

As shown by FIG. 1, the first step in preparing optical media is digitally mastering 106 the source material 104. Typical theater images generally utilize display resolutions of between 1280×1024 and 2048×1024 pixels, with between 20 and 42 bits per pixel. At 24 frames per second, these resolutions require a data transfer rate between 0.629 and 2.11 gigabits per second—much too high to be cost effective. To lower the data rate and data storage requirements, the digital data must be compressed. Referring to FIG. 1, the digitally mastered data is compressed 104, using any of the available image compression techniques.

Consumer DVD systems use MPEG2 digital data compression to reduce a two-hour movie to an average 4.7 megabits per second data rate. MPEG2, however, may not provide the high quality images required for large screen theaters. Other methods such as high bit rate MPEG and wavelet transforms are used by various embodiments. To further enhance security of the data, a non-consumer compression algorithm is chosen. The use of a non-consumer compression algorithm reduces the availability of decompression algorithms and circuitry and increases the effort and expense of defeating the disclosed security system.

Some embodiments of the disclosed invention add a digital watermark to the digital electronic cinema data prior to the compression step 108. A digital watermark is formed by changing some of the bits in an image. Ideally, a viewer will not be able to detect the changes in the image data, but when the image data is compared with the original image data the changed bits are evident. A digital watermark does not enhance security, but does provide traceability. Since each copy, or set of copies, of a motion picture has a unique watermark any unauthorized copies seized are easily traced to the source. Alternative embodiments of the disclosed system insert watermark information as the media player 118 reads the electronic cinema data, or as the projector 128 processes and displays the data. Using multiple watermarks, added by the source, media player, and media projector, pinpoints where in the distribution chain an unauthorized copy of the data stream was made.

The compressed digital data is then encrypted 110 to prevent unauthorized access to the digitally mastered data. Although any encryption algorithm will suffice, the level of security will vary greatly depending on the algorithm chosen since some encryption techniques are much easier to defeat, or crack, than other encryption algorithms. For a given encryption technique, the length of the key, or code the receiver must know in order to decrypt the encrypted data, determines the strength of the encryption since each bit added to the key length doubles the number of possible key words. To further enhance the strength of the encryption, one embodiment of the present invention changes the encryption algorithm or key within a given set of discs. For example, according to one embodiment of the present invention each of the theatrical optical discs required for a full-length motion picture uses a different encryption algorithm, and even portions of a single theatrical optical disc use different algorithms and keys. Assuming a sufficiently strong encryption technique is selected, once the digital data is encrypted, the information contained in the digitally compressed data is relatively safe from unauthorized duplication.

Once the digital electronic cinema data is compressed and encrypted, it is written to one or more storage devices 114, shown in FIG. 1 as theatrical optical discs. At least one of the theatrical optical discs includes an identification module 116, typically an identification module such as a TIRIS module, which further increases the security of the distribution system. According to one embodiment, a TIRIS module is embedded in each of the theatrical optical discs. The identification module 116 preferably is attached to or embedded in the media 114, but need only be associated with the media 114 to derive the benefits of the disclosed invention. For example, various embodiments of the disclosed invention foresee including the identification module 116 in the packaging material holding the media 114 and forming a separate cartridge with the identification module 116 which is sometimes even be shipped separately.

The identification module 116 is typically preloaded with several types of information, including information about the theatrical optical disc contents, information about the encryption algorithm used to encode the data, information about which media players and projectors are authorized to read and decode the information on the theatrical optical discs, and information concerning the number of times the media may be used. According to various embodiments of the disclosed invention, the TIRIS module includes the key or keys necessary to decrypt the data on the theatrical optical discs. Including the decryption keys with the media, however, weakens the security of the overall system and is not preferred. Alternatives to including the decryption keys with the media will be discussed below.

After the electronic cinema data is stored on the theatrical optical discs and the necessary information is stored in the identification module, the discs are shipped to the theaters. Since the theatrical optical discs are much smaller and lighter than the canisters of film previously used, and because the security techniques disclosed herein reduce or eliminate the need for in-transit protection of the theatrical optical discs, theatrical optical discs produced according to the process shown in FIG. 1 incur much lower shipping costs compared to corresponding canisters of film.

Once the storage media 114 are received by a theater, it is read by a media player 118 equipped with an identification module interrogator 122. Although shown as two separate components in FIG. 1, the media player 118 and projector 128 are combined as a single unit according to some embodiments of the present invention. Alternative embodiments move some functions from one component to the other with various effects on the level of security provided by the system.

The identification module interrogator 122 reads the authorization data, or authorization code, from the identification module 116 located on the storage media 114 and compares the authorization data to a unique identifier, such as the serial number, of the media player 118. If the authorization data in the RF transponder 116 and the unique identifier agree, the media player 118 will read the media 114. If the authorization data and the unique identifier do not match, the media player 118 does not read the media 114. Requiring a match between the authorization data and the media player 118 reduces or eliminates the value realized by the theft of the media 114 and therefore reduces the amount of physical security required to protect the media 114 during transit.

The authorization data contained in the identification module 116 and the media player's unique identifier need not be identical to be considered a "match." As long as there is a relationship between the authorization data and the unique identifier that allows the media player 118 to determine whether it is authorized, a match occurs when the media player 118 determines it is authorized to read the data from the media 114. For example, according to one embodiment a blank authorization code matches any identification code and authorizes all media players to read the media 114.

Alternative embodiments use multiple authorizations codes or special group authorization codes to authorize a group of media players to read the media 114. Including multiple authorization codes, or group codes, enables a data distributor to authorize all of the projectors at a particular theater, or chain of theaters, to read the media, granting the theater management flexibility to shift movies between screens based on ticket sales without the need to move equipment. Likewise, the use of a group code allows release of a title for viewing on home theater-class projectors, but not on commercial movie theater-class projectors—thus preserving the commercial market for royalty producing sales.

Assuming the media player authorization code matches the media player's unique identifier, the projector authorization code, which is also read from the identification module 116 embedded in the media 114, and the encrypted electronic cinema data read from the media 114 are sent by the media player 118 to the projector 128. The projector 128 compares the projector authorization code received from the media player 118 with the projector's unique identifier. If the authorization code received from the media player matches the projector's unique identifier, the projector 128 will decrypt the electronic cinema data and decompress the decrypted data. The decompressed data, which is an exact copy of the digital master, is then displayed by the projector 128.

One of the major advantages of digital electronic cinema data is the ability of the data stream to describe itself. For example, headers in the electronic cinema data stream are used to describe the format of the electronic cinema data stream including the intended screen resolution, frame rate, and data word size, as well as the encryption and compression algorithms used. Once this information is known by the media player and projector, the electronic cinema data is reformatted, if necessary, to optimize the display of the data on the screen. For this reason, the particular algorithms used and the particular design of the media player and projector are not critical to the implementation of the disclosed invention.

Figure 2:
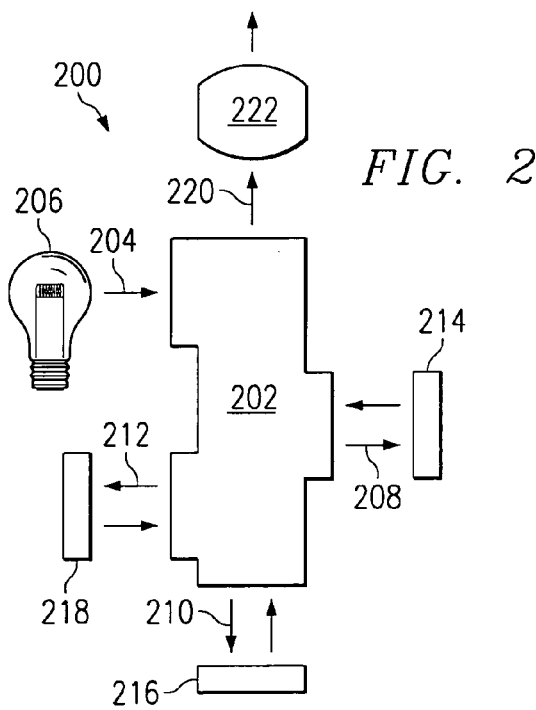
FIG. 2 is a schematic representation of a three-chip DMD-based projection system.

According to one embodiment of the disclosed invention, a digital light processing (DLP®) projection engine is used to display the electronic cinema data signal. To achieve a suitable image quality for motion picture theater images, a three-chip digital micromirror device (DMD) design is envisioned, having a resolution of approximately 1280×1024 pixels or higher. FIG. 2 is a block diagram of a three-chip DMD image projection system 200 capable of producing theater-quality true digital images. In FIG. 2, a dichroic prism assembly 202 splits a beam of white light 204 from a light source 206 into three separate single-color light beams 208, 210, 212. Three DMDs 214, 216, 218 modulate these three single-color light beams and reflect the modulated light back to the prism assembly 202 where the modulated light is recombined into a full-color modulated light beam 220 and focused by lens 222 onto a projection screen (not shown). Prism assembly 202 is typically comprised of several individual prisms which have dichroic filters on various surfaces and which utilize total internal reflection to separate certain wavelengths of light from the remainder of the light beam.

One feature of the system of FIG. 1, which further increases the difficulty of defeating the security system, is that decrypted data is never available at any connector external to the projector unit 128 or media player 118. Some embodiments of the projector 128 include display devices 138 which are integrated on a single integrated circuit with the decompress/format functions 134 and memory 136 so that the decrypted data is not even available outside an integrated circuit. Preventing access to the decrypted data prevents owners and users of projector 128 from recording the decrypted information during a playback of the recorded material.

As discussed above, a decryption code, or key, is crucial to the efficient decryption and playback of the media 114. Therefore, the transmission of the key from the media producer, typically the production studio, to the media user, typically the theater, adds another dimension to the strength of the security measures. The simplest method of providing the key to the theater is to simply include the key with the media 114, either as part of the data recorded on the media 114 or as part of the security codes written into the identification module 116. Since the key is provided to whoever gains possession of the media 114, this approach relies only on the authorization codes sent with the media 114, and the design of the media players 118, to prevent unauthorized access to the recorded data.

Data security is enhanced by transmitting the key to the media player 118 through a separate distribution channel. According to various embodiments of the present invention, copies of the encryption key are sent to the media player 118 through various other channels including the U.S. Postal Service or other mail carrier, dial-up or on-line telecommunication links, and direct satellite broadcasts. Each of these communications channels is utilized autonomously by the media player 118, or independently by a projectionist.

In addition to providing increased data security, the disclosed security system also provides a convenient means for collecting information regarding media usage by the theaters. The type of information collected from the theaters is limited only by the imagination, but will generally deal with the types of information that effect either the royalties paid by the theaters or the marketing strategies of the distributors. Such information will be referred to as usage information for the purposes of this disclosure.

For example, the identification module interrogator 122 may store usage information about how many times a particular disc has been read, or when the disc was read, in the identification module 116 embedded in the media 114. If more than one projector 128 or media reader 118 is authorized to read the media 114, the identification module interrogator 122 may store usage information about which media player 118 or projector 128 actually did read the media 114 in the identification module's memory. Usage information concerning the time and date of the showing, or the number attending the showing could also be stored in the identification module 116.

All of the usage information stored by the theaters during the use of the media 114 may be read by an information collection agency upon return of the media 114. Information collection agencies include the potion picture studios, distributors, theaters, or marketing agencies. The usage information is used to determine royalty and other payments owed by or to the theaters, advertising agencies, or other entities, and possibly to refine marketing strategies for future releases. By storing the usage information in the identification module 116 instead of on the media 114 itself, the usage information can be read even if the media 114 intentionally is destroyed prior to return shipment to the distributor. Destruction of the media 114 prior to reshipment eliminates the risk of theft since the media 114 would be of no value to potential thieves.

Alternatively, the usage information is transferred to the information collection agency by the media player 118 or projector 128 using a wired or wireless communications link. For example, the media player 118 or projector 128 may use a dial-up service, internet access, or a satellite link to transmit the information to the information collection agency.

Figure 3:
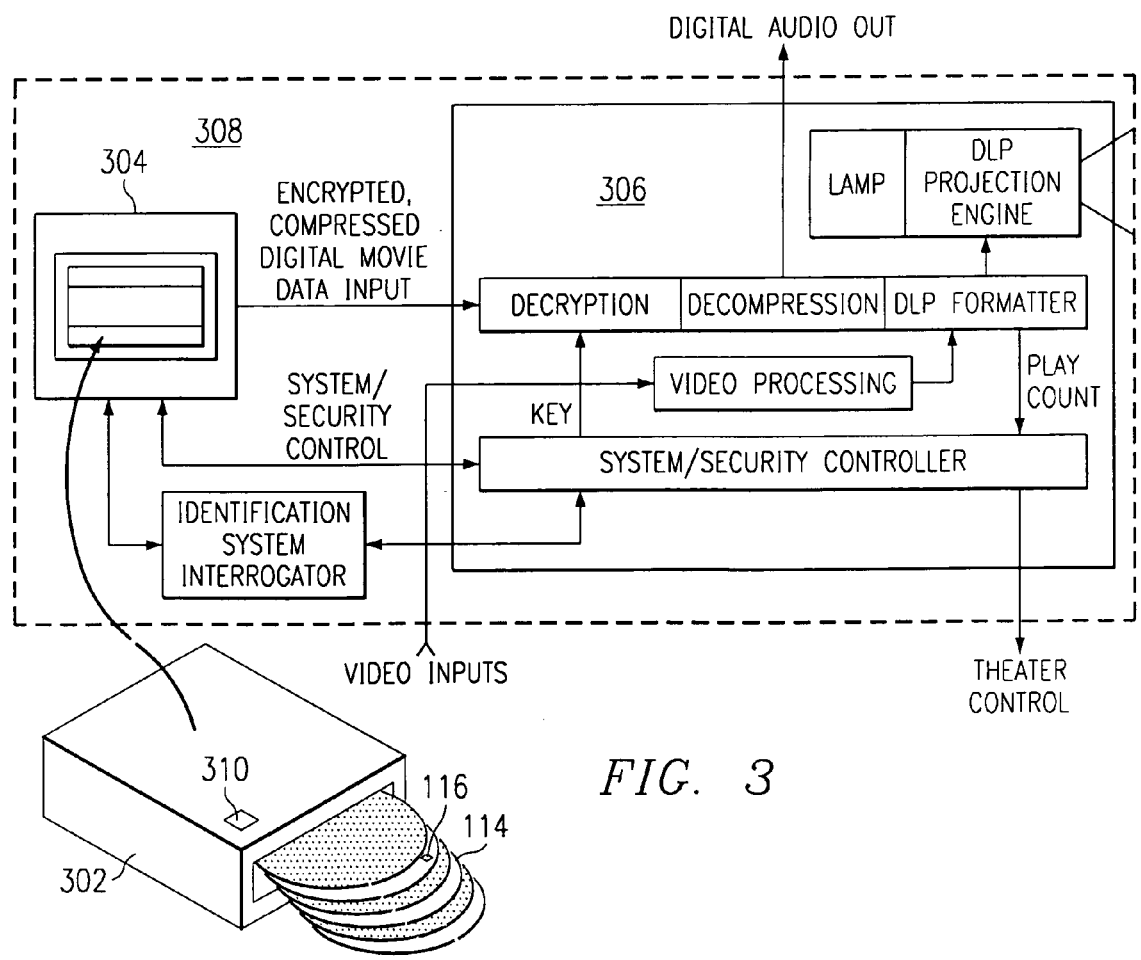
FIG. 3 is a block diagram of one embodiment of an improved distribution system showing a tamper-proof disc cartridge, and a combined media player and projector.

An additional level of security is provided by packaging the media 114 in a tamper-proof cartridge 302 as shown in FIG. 3. The tamper-proof cartridge 302 is designed to prevent unauthorized access to the media 114. A first cartridge design prevents the cartridge 302 from being opened except by a media player 304. This design is further strengthened by designing the media player 204 to open cartridges 302 only after receiving the proper authorization code from the media's identification module 116 or a separate cartridge identification module 310. A second cartridge design includes a separate authentication means within the cartridge 302 which will not allow the cartridge 302 to be opened unless the authentication means receives the proper code from the media player 304. In addition to merely preventing the cartridges 302 from opening, some embodiments of the tamper-proof cartridges 302 damage or destroy the media 114 contained within the cartridge 302. For example, various embodiments damage the media by dyeing, scratching, or breaking the media 114, or by erasing the data stored in the identification system module, including the encryption key if stored in the identification system module.

The media player/projector 308 shown in FIG. 3 also provides a separate input for video signals. These video signals bypass the decryption and decompression blocks and are merely reformatted for display on the DLP projection engine. Alternative embodiments route the alternate video inputs through the decryption and decompression blocks as needed. The alternate video path is used for video sources which are incompatible with the media 304. For example, a theater can show a pay-per-view boxing match to patrons using a separate video receiver and the alternate video signal path.

The media player/projector 308 shown in FIG. 3 also includes outputs from the system controller which enable the player/projector 308 to control other theater equipment. According to one embodiment, the player/projector dims the lights and opens the theater curtain as a movie starts. Additionally, the player/projector is capable of projecting commercial, previews, and trailers selected by the local theater before and after a movie showing, without the need for operator intervention.

Thus, although there has been disclosed to this point a particular embodiment for system for the secure transmission of digital data, and method therefore, which greatly increases the distributor's control over access to the digital data, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. A secure digital image projection system having at least one identification code identifying said image projection system, said image projection system comprising:
   an identification system interrogator for reading an authorization code from an identification system module associated with a data storage medium;
   a verification unit for verifying said authorization code matches said identification code;
   a media player for reading digital data stored on said data storage medium; and
   a projection unit for displaying said digital data on the condition that said authorization code matches said identification code.

2. The secure digital image projection system of claim 1, said identification system module comprising an RF identification system module.

3. The secure digital image projection system of claim 1, said identification system module comprising a TIRIS transponder.

4. The secure digital image projection system of claim 1, wherein said digital data stored on said medium is encrypted, said projection system further comprising:
   a decryption unit for decrypting said encrypted digital data prior to display of said digital data.

5. The secure digital image projection system of claim 1, said image projection system further comprising:
   a media jukebox for opening a tamper-proof cartridge containing said data storage medium, and for accessing said data storage medium.

6. The secure digital image projection system of claim 1, wherein said projection system adds a digital watermark to said digital data read from said data storage medium.

7. The secure digital image projection system of claim 1, wherein said media player adds a digital watermark to said digital data read from said data storage medium.

8. The secure digital image projection system of claim 1, wherein said projection unit adds a digital watermark to said digital data read from said data storage medium.

9. The secure digital image projection system of claim 1, wherein said projection system stores usage information on said identification system module.

10. The secure digital image projection system of claim 9, wherein said usage information comprises at least one said identification code identifying said image projection system.

11. The secure digital image projection system of claim 1, wherein said projection system transmits usage information to a collection agency.

12. The secure digital image projection system of claim 11, wherein said usage information comprises at least one said identification code identifying said image projection system.

13. The secure digital image projection system of claim 1:
   said media player having a first identification code;
   said projector unit having a second identification code; and said verification unit comprising a first verification unit in said media player and a second verification unit in said projector unit, said authorization code comprising a first and a second authorization code, said media player only reading said digital data from said data storage medium on the condition that said first authorization code matches said first identification code, and said projector unit only displaying said digital data on the condition that said second authorization code matches said second identification code.

14. A secure digital data media player comprising:
an identification system interrogator for reading authorization information from an identification system module attached to a digital data storage medium and verifying said authorization information authorizes said media player to read said digital data storage medium; and
a media reader for reading data from said digital data storage medium and outputting said data on the condition said authorization information authorizes said media player to read said digital data storage medium.

15. The secure digital data media player of claim 14, said identification system module comprising an RF identification system module.

16. The secure digital data media player of claim 14, said identification system module comprising a TRIS transponder.

17. The secure digital data media player of claim 14, wherein said digital data stored on said medium is encrypted, said media player-projector further comprising:
a decryption unit for decrypting said encrypted digital data prior to display of said digital data.

18. The secure digital data media player of claim 14, further comprising:
a media jukebox for opening a tamper-proof cartridge containing said data storage medium, and for accessing said data storage medium.

19. The secure digital data media player of claim 14, wherein said media player adds a digital watermark to said data read from said digital data storage medium.

20. The secure digital data media player of claim 14, wherein said projection system stores usage information on said identification system module.

21. The secure digital data media player of claim 20, wherein said usage information comprises at least one said identification code identifying said secure digital data media player.

22. The secure digital data media player of claim 14, wherein said projection system transmits usage information to a collection agency.

23. The secure digital data media player of claim 22, wherein said usage information comprises the at least one said identification code identifying said secure digital data media player.

24. A secure data storage medium comprising:
a digital storage medium for storing digital data; and
an identification system module corresponding to said digital storage medium, said identification system module containing an authorization code describing which media players are authorized to read digital data from said digital storage medium.

25. The secure data storage medium of claim 24, said digital storage medium comprising an optical disc.

26. The secure data storage medium of claim 24, said identification system module comprising a TIRIS transponder.

27. The secure data storage medium of claim 24, said identification system module comprising a radio frequency transponder.

28. The secure data storage medium of claim 24, wherein said identification system stores usage information.

29. The secure data storage medium of claim 28, wherein said usage information comprises information concerning the number of times said digital data has been read.

30. A method of securely distributing digital data, said method comprising:
writing digital data onto a digital storage medium;
attaching an identification system module to said digital storage medium, said identification system module containing an authorization code indicating which media readers are authorized to read said digital storage medium; and
transferring said digital storage medium to a user.

31. The method of claim 30, said writing step comprising the step of writing digital data onto an optical disc.

32. The method of claim 30, said attaching step comprising the step of attaching an RF identification system to said digital storage medium.

33. The method of claim 30, said attaching step comprising the step of attaching a TIRIS responder to said digital storage medium.

34. The method of claim 30, further comprising the step of:
adding a digital watermark to said digital data; and
wherein said step of writing digital data onto a digital storage medium comprises the step of writing said digital data containing said digital watermark onto said digital storage medium.

35. The method of claim 30, further comprising the step of:
reading said digital data from said digital storage medium; and
storing usage information on said digital storage medium.

36. The method of claim 31, further comprising the step of:
reading said digital data from said digital storage medium; and
transmitting usage information to a collection agency.

37. A secure data storage medium comprising:
a digital storage medium for storing digital data; and
an identification system module corresponding to said digital storage medium, said identification system module containing an authorization code, said authorization code operable to authorize certain media players to read said digital data when an identifier code in said media player matches said authorization code.

38. The secure data storage medium of claim 37, said digital storage medium comprising an optical disc.

39. The secure data storage medium of claim 37, said identification system module comprising a radio frequency transponder.

40. The secure data storage medium of claim 37, wherein said identification system stores usage information.

41. The secure data storage medium of claim 40, wherein said usage information comprises information concerning the number of times said digital data has been read.

42. A method of securely distributing digital data, said method comprising:
writing digital data onto a digital storage medium;
attaching an identification system module to said digital storage medium, said identification system module containing an authorization code, said authorization code operable to authorize certain media players to read said digital data when an identifier code in said media player matches said authorization code; and transferring said digital storage medium to a user.

43. The method of claim 42, said writing step comprising the step of writing digital data onto an optical disc.

44. The method of claim 42, said attaching step comprising the step of attaching an RF identification system to said digital storage medium.

45. The method of claim 42, further comprising the step of:

adding a digital watermark to said digital data; and wherein said step of writing digital data onto a digital storage medium comprises the step of writing said digital data containing said digital watermark onto said digital storage medium.

46. The method of claim 42, further comprising the step of:

reading said digital data from said digital storage medium; and storing usage information on said digital storage medium.

47. The method of claim 42, further comprising the step of:

reading said digital data from said digital storage medium; and transmitting usage information to a collection agency.

* * * * *